Figure 1:
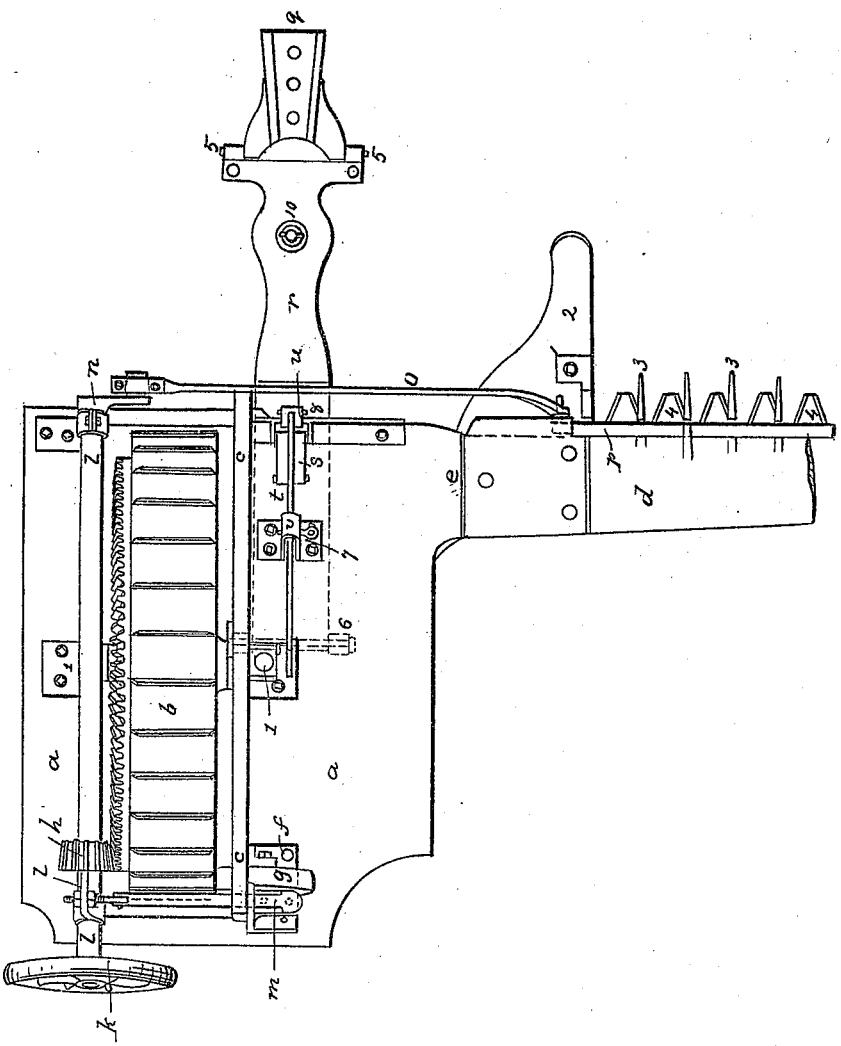

2 Sheets—Sheet 1.

T. D. BURRALL.
Mowing Machine.

No. 20,035.

Patented April 27, 1858.

Witnesses:
E. J. Burrall
W. D. Burrall

Inventor:
Thomas D. Burrall

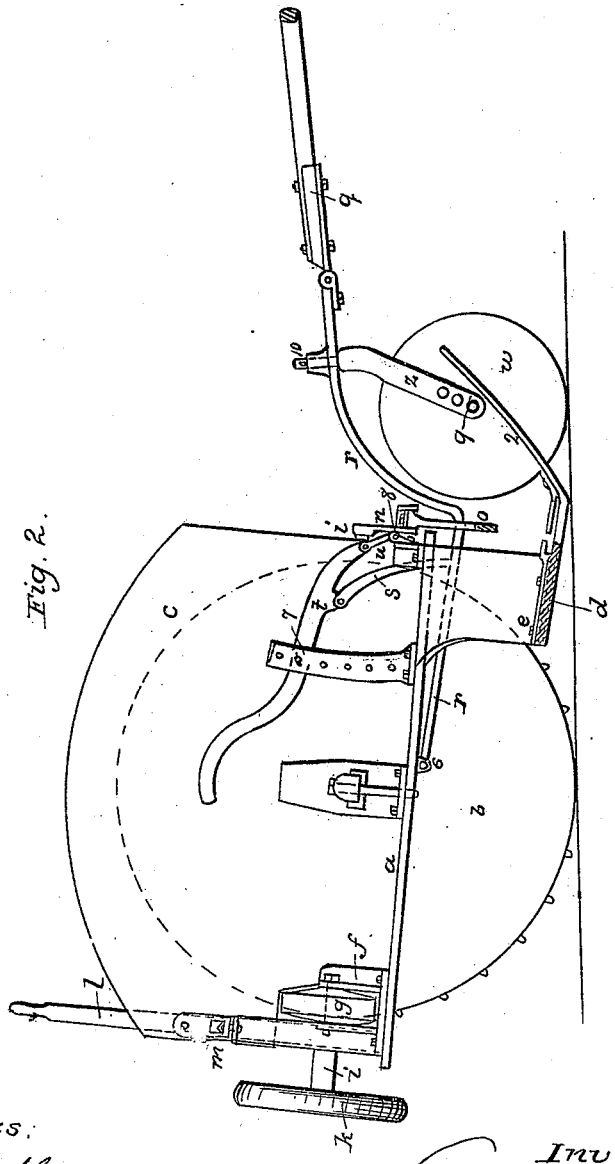

UNITED STATES PATENT OFFICE.

THOS. D. BURRALL, OF GENEVA, NEW YORK.

IMPROVEMENT IN MOWING-MACHINES.

Specification forming part of Letters Patent No. 20,035, dated April 27, 1858.

*To all whom it may concern:*

Be it known that I, THOMAS D. BURRALL, of Geneva, in the county of Ontario and State of New York, have invented, made, and applied to use certain new and useful Improvements in Mowing-Machines; and I do hereby declare that the following is a full, clear, and exact description of the construction and operation of the same, reference being had to the annexed drawings, making part of this specification, wherein—

Figure 1 is a plan of a mowing-machine with my improvement applied thereto, and Fig. 2 is a side elevation of the same. In both figures portions of the finger-board are removed to show the other parts.

Similar marks of reference denote the same parts.

Various devices have heretofore been used for elevating the finger-board in order to pass over any obstruction, and also to allow of the machine being freely drawn about a field or transported without the cutters and fingers coming in contact with the cut grass or other obstructions.

My said invention consists in a peculiar arrangement of devices for connecting a caster-wheel with the main frame in such a manner that the finger-board can be elevated when not in use the desired amount for the purposes before indicated or for cutting the grass closer to or farther from the earth, or for converting the mowing-machine instantly into a reaping-machine.

In the drawings, *a* is the bed of the machine. *b* is the main or driving wheel on the shaft 1. *c* is the guard to said wheel. *d* is the finger-board, connected at *e* to the bed *a*. 2 is the guard at the inner end of the cutter-bar. *f* is a standard carrying the friction-roller *g*. *h* is a pinion on the shaft *i*, driven by a face-gear on the wheel *b*. *k* is the fly or hand wheel. *l* is the lever, and *m* the slide, for disconnecting the pinion *h*. *n* is the crank, and *o* the connecting-rod to the cutter-bar *p*, and 4 4 are the cutters within the guards 3 3. The parts thus far described are of any desired construction and operate in the well-known manner, and therefore do not require further description.

*q* is the socket for the tongue, to which the animal or animals are attached to draw the machine. This socket is attached at 5 5 to the auxiliary frame *r*, that is connected at 6 to the under side of the main frame, near the center thereof. This auxiliary frame *r* is supported on the caster-wheel *w* by the fork *x* and axle 9.

10 is the pin passing through the frame *r*, on which the caster-wheel *w* and fork *x* are allowed a lateral movement.

*s* is a sector attached to the auxiliary frame *r* and passing through a slot in the frame *a*, the upper end of which sector is jointed to the lever *t*.

*u* is a link jointed at 8 to the frame *a*, and forming the fulcrum of said lever *t*. This lever *t* moves between the standards *v* and operates to raise the finger-board from the ground a greater or less distance as the said lever is depressed, in which case the sector *s* of the auxiliary frame *r* becomes the fulcrum on which to elevate the forward part of the frame *a* and the finger-board *d*. A pin, 7, through the standards *v*, retains the lever *t* at any point to which it may be moved.

The shoe at the outer end of the finger-board (not shown in the drawings) has a roller or wheel at its rear end, in the manner now usual, on which this end travels when the finger-board is elevated.

I am well aware that caster-wheels have heretofore been used in mowing-machines, and that the same have been movably connected to the frame, so as to act in regulating the height of the cutter-bar and finger-board.

I am also aware that levers have been used in connection with a perch or pole in such a manner that the finger-board could be elevated by changing the angle between the frame and said pole, using the outer end of the pole where connected to the horses as a bearing-point; but I am not aware of any previous instance in which an auxiliary frame has been connected at one end to the main frame at or near the center of the driving-wheel, and supported at the other end by a caster-wheel, so that the line of the finger-board lies between said caster and main wheel when combined with the levers for elevating or depressing the forward part of the main frame and the finger-board, whereby the said finger-board is retained steadily at any desired height, and the aforesaid auxiliary frame and caster-wheel form a carriage, to which the horses are attached by a loose pole, as set forth.

What I claim as my invention, and desire to secure by Letters Patent, is—

The auxiliary frame $r$ and caster-wheel $w$, forming a carriage, to which the animals are attached by a loose pole, when combined with the sector $s$, lever $t$, and standard $v$, as specified, whereby the forward part of the main frame $a$ and the cutter-bar $d$ are elevated or depressed on a line between the caster-wheel $w$ and main wheel $b$, substantially as and for the purposes specified.

In witness whereof I have hereunto set my signature this 13th day of March, 1858.

THOMAS D. BURRALL.

Witnesses:
W. D. BURRALL,
E. J. BURRALL.